(12) United States Patent
Kobayashi et al.

(10) Patent No.: US 9,289,723 B2
(45) Date of Patent: Mar. 22, 2016

(54) EXHAUST SYSTEM FOR SADDLE-RIDE TYPE VEHICLE

(71) Applicant: HONDA MOTOR CO., LTD., Tokyo (JP)

(72) Inventors: Atsushi Kobayashi, Wako (JP); Takashi Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 180 days.

(21) Appl. No.: 13/767,946

(22) Filed: Feb. 15, 2013

(65) Prior Publication Data

US 2013/0259760 A1 Oct. 3, 2013

(30) Foreign Application Priority Data

Mar. 28, 2012 (JP) ................. 2012-074779

(51) Int. Cl.
*B01D 50/00* (2006.01)
*B01D 53/94* (2006.01)
*F01N 13/18* (2010.01)
*F01N 1/00* (2006.01)
*F01N 13/00* (2010.01)

(52) U.S. Cl.
CPC ............ *B01D 53/94* (2013.01); *B01D 53/9454* (2013.01); *F01N 1/00* (2013.01); *F01N 13/0093* (2014.06); *F01N 13/1805* (2013.01); *F01N 2230/04* (2013.01); *F01N 2260/10* (2013.01); *F01N 2590/04* (2013.01); *Y02T 10/22* (2013.01)

(58) Field of Classification Search
CPC ............ F01N 2590/04; F01N 13/0093; F01N 13/1805; B01D 53/94; Y02T 10/22
USPC ........................... 422/168, 177, 170; 181/228
See application file for complete search history.

(56) References Cited

U.S. PATENT DOCUMENTS 5,729,972 A * 3/1998 Hayashi .................. F01N 3/005
422/180
6,129,059 A * 10/2000 Asai ........................ F02B 19/02
123/65 A

FOREIGN PATENT DOCUMENTS

| EP | 1749988 A1 * | 2/2007 |
| JP | 2007309134 A * | 11/2007 |
| JP | 4673789 B2 | 4/2011 |
| WO | WO 2008149777 A1 * | 12/2008 |

\* cited by examiner

*Primary Examiner* — Tom P Duong
(74) *Attorney, Agent, or Firm* — Birch, Stewart, Kolasch & Birch LLP

(57) ABSTRACT

An exhaust system for a saddle-ride type vehicle that can make it hard for the heat of a catalyst body to be transmitted to an external plate of a muffler. A catalyst body is installed in a muffler. An exhaust system has a tubular case covering the outer circumferential surface of the catalyst body along from the exhaust gas inlet to outlet of the catalyst body. The catalyst body is secured at its inlet-side end portion to one end portion of the case and the catalyst body is supported at its outlet-side end portion by the other end portion of the case. The case is supported at its outer circumferential surface by the front end portion of the muffler.

20 Claims, 7 Drawing Sheets

EXHAUST SYSTEM FOR SADDLE-RIDE TYPE VEHICLE

CROSS-REFERENCE TO RELATED APPLICATIONS

The present application claims priority under 35 USC 119 to Japanese Patent Application No. 2012-074779 filed Mar. 28, 2012 the entire contents of which are hereby incorporated by reference.

BACKGROUND OF THE INVENTION

1. Field of the Invention

The present invention relates to an exhaust system for a saddle-ride type vehicle.

2. Description of Background Art

A conventional exhaust system for a saddle-ride type vehicle is known in which a catalyst body is supported in an enlarged-diameter portion of an exhaust pipe by a support member. In addition, the support member includes an upstream side support member supporting the upstream-side end portion of the catalyst body and a downstream side support member supporting the downstream-side end portion of the catalyst body. See, for example, Japanese Patent No. 4673789.

In addition, the exhaust system for a saddle-ride type vehicle described in Japanese Patent No. 4673789 mentioned above is such that the catalyst body is connected to an external plate of a muffler by the upstream side support member and the downstream side support member. Thus, the heat of the catalyst body is easily transmitted to the external plate of the muffler.

SUMMARY AND OBJECTS OF THE INVENTION

The present invention has been made in view of such circumstances and aims to provide an exhaust system for a saddle-ride type vehicle that can make it hard for the heat of a catalyst body to be transmitted to an external plate of a muffler.

According to an embodiment of the present invention, an exhaust system for a saddle-ride type vehicle having a catalyst body in a muffler is provided wherein the exhaust system has a tubular case covering an outer circumferential surface of the catalyst body along an exhaust gas inlet to outlet of the catalyst body The catalyst body is secured at an inlet-side end portion thereof to one end portion of the case and is supported at an outlet-side end portion thereof by the other end portion of the case. The case is supported at an outer circumferential surface by a front end portion of the muffler.

According to an embodiment of the present invention, a space between an external plate of the muffler and the case communicates with a sound absorbing chamber located on the downstream side of the catalyst body.

According to an embodiment of the present invention, the catalyst body is a second catalyst body, a first catalyst body is disposed in an exhaust pipe located on the upstream side of the second catalyst body, and the exhaust pipe is joined to the case at a downstream end thereof.

According to an embodiment of the present invention, the exhaust pipe is curvedly formed so that an axis line of the first catalyst body may intersect an axis line of the case.

According to an embodiment of the present invention, the exhaust pipe is formed in a left-right-divided flat-stacked shape so as to be joined to the inlet-side end portion of the first catalyst body.

According to an embodiment of the present invention, the exhaust pipe is formed such that the first and second catalyst bodies are disposed above a swing arm supporting a rear wheel and along the swing arm during the swinging of the first catalyst body and the second catalyst body are disposed at an upside and at a downside, respectively.

According to an embodiment of the present invention, the exhaust system has the tubular case covering an outer circumferential surface of the catalyst body along an exhaust gas inlet to outlet of the catalyst body. The catalyst body is secured at the inlet-side end portion to one end portion of the case and the catalyst body is supported at the outlet-side end portion by the other end portion of the case. The case is supported at the outer circumferential surface thereof by the front end portion of the muffler. Therefore, while absorbing the thermal expansion of the catalyst body, the catalyst body can be supported stably. In addition, it is possible to make it hard for the heat of the catalyst body to be transmitted to the external plate of the muffler.

According to an embodiment of the present invention, the space between the external plate of the muffler and the case communicates with a sound absorbing chamber located on the downstream side of the catalyst body. Therefore, the space between the external plate of the muffler and the case can be used as a sound absorbing chamber. Thus, a downsizing of the muffler can be achieved.

According to an embodiment of the present invention, the catalyst body is a second catalyst body, the first catalyst body is disposed in an exhaust pipe located on the upstream side of the second catalyst body and the exhaust pipe is joined to the case at the downstream end thereof. Therefore, the second catalyst body can be brought close to the first catalyst body. Thus, the reaction heat of the first catalyst body becomes easy to be transmitted to the second catalyst body, which can enhance the exhaust gas purifying performance of the catalyst body.

According to an embodiment of the present invention, the exhaust pipe is curvedly formed so that the axis line of the first catalyst body may intersect the axis line of the case. Therefore, while bringing the first catalyst body and the second catalyst body close to each other, the exhaust pipe has a bent structure. Thus, the flow of exhaust gas is made turbulent so that the exhaust gas is stirred, which can enhance the exhaust gas purifying performance of the second catalyst body.

According to an embodiment of the present invention, the exhaust pipe is formed in a left-right-divided flat-stacked shape so as to be joined to the inlet-side end portion of the first catalyst body. Therefore, the bending shape of the housing chamber housing the first catalyst body and of the exhaust pipe can be formed accurately and inexpensively.

According to an embodiment of the present invention, the exhaust pipe is formed such that the first and second catalyst bodies are disposed above the swing arm supporting the rear wheel and along the swing arm during the swinging the first catalyst body and the second catalyst body are disposed at an upside and at a downside, respectively. Therefore, while the exhaust pipe having the catalyst body is disposed in the rear portion of the vehicle body, the catalyst body can be spaced away from the road surface and an occupant. Thus, while protecting the exhaust system, downsizing of the vehicle can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
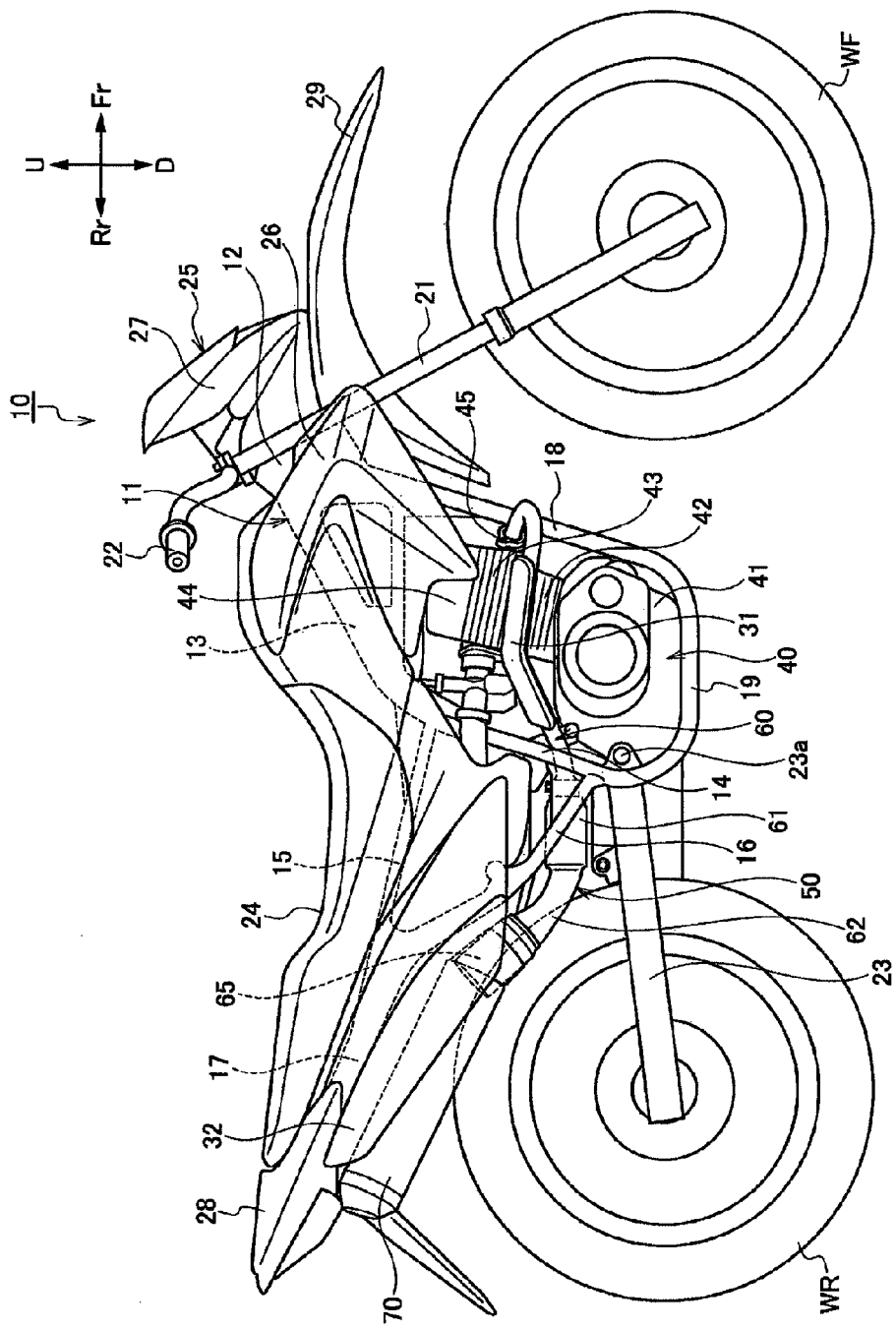
FIG. 1 is a right lateral view for assistance in explaining a motorcycle on which an exhaust system according to an embodiment of the present invention is mounted.

An embodiment of an exhaust system for a saddle-ride type vehicle according to the present invention will hereinafter be described in detail with reference to the drawings. It is to be noted that the drawings shall be viewed based on the direction of reference numerals. In the following description, front and back or rear, left and right, and upside and downside are based on a direction a driver faces. In the drawings, the front of the vehicle is indicated by symbol Fr, the rear is indicated by symbol Rr, the left is indicated by symbol L, the right is indicated by symbol R, the upside is indicated by symbol U and the downside is indicated by symbol D.

As shown in FIG. 1, a motorcycle (a saddle-ride type vehicle) 10 of the present embodiment has a body frame 11 that includes a head pipe 12 installed at a front end with a main frame 13 extending rearwardly and downwardly from the head pipe 12; a pair of left and right pivot frames 14 extending downward from the rear end of the main frame 13. A pair of left and right rear frames 15 are joined to the corresponding upper ends of the pivot frames 14 and extend rearwardly with a pair of left and right sub-frames 16 joined to the corresponding lower ends of the pivot frames 14 and extending rearwardly and upwardly. A pair of left and right rear brackets 17 are provided to which the corresponding rear ends of the rear frames 15 and of the sub-frames 16 are joined. A down frame 18 extends downwardly from the head pipe 12 with a pair of left and right bottom frames 19 connecting the lower end of the down frame 18 with the pivot frames 14. An engine 40 is mounted in a space surrounded by the main frame 13, the pivot frames 14, the down frame 18 and the bottom frames 19.

The motorcycle 10 includes a front fork 21 steerably supported by the head pipe 12 with a front wheel WF rotatably supported by the lower end portion of the front fork 21. A steering handlebar 22 is mounted to the upper end of the front fork 21 with swing arms 23 swingably supported by the pivot frames 14 via a pivot shaft 23a. A rear wheel WR is rotatably supported by the rear end portions of the swing arms 23. A seat 24 is mounted on the rear frames 15.

A vehicle body of the motorcycle 10 is covered by a body cover 25. The body cover 25 has a shroud 26 that covers the sides of the main frame 13 and the down frame 18, a front cowl 27 and a rear cowl 28. In addition, in FIG. 1 a front fender 29 is provided with an exhaust pipe cover 31 and a muffler cover 32.

As shown in FIG. 1, the engine 40 has a shell composed mainly of a crankcase 41, a cylinder block 42 mounted on a front upper end of the crankcase 41, a cylinder head 43 mounted on an upper end of the cylinder block 42 and a cylinder head cover 44 covering the upper opening of the cylinder head 43. The engine 40 is of a front exhaust type and is provided with an exhaust port 45 on a front surface of the cylinder head 43. An exhaust system 50 is joined to the exhaust port 45.

Figure 2:
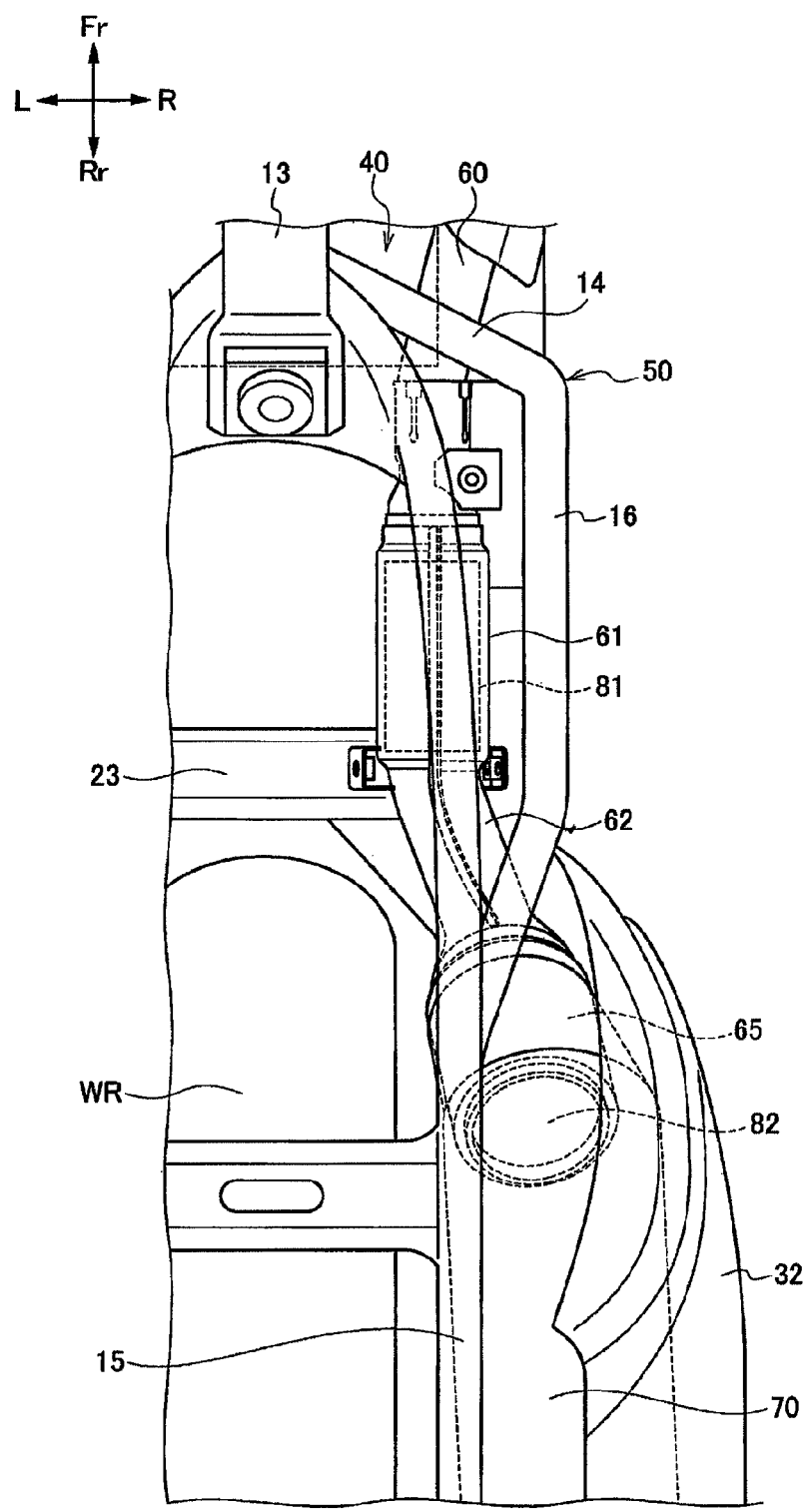
FIG. 2 is a top view of the surround of the exhaust system shown in FIG. 1.
Figure 3:
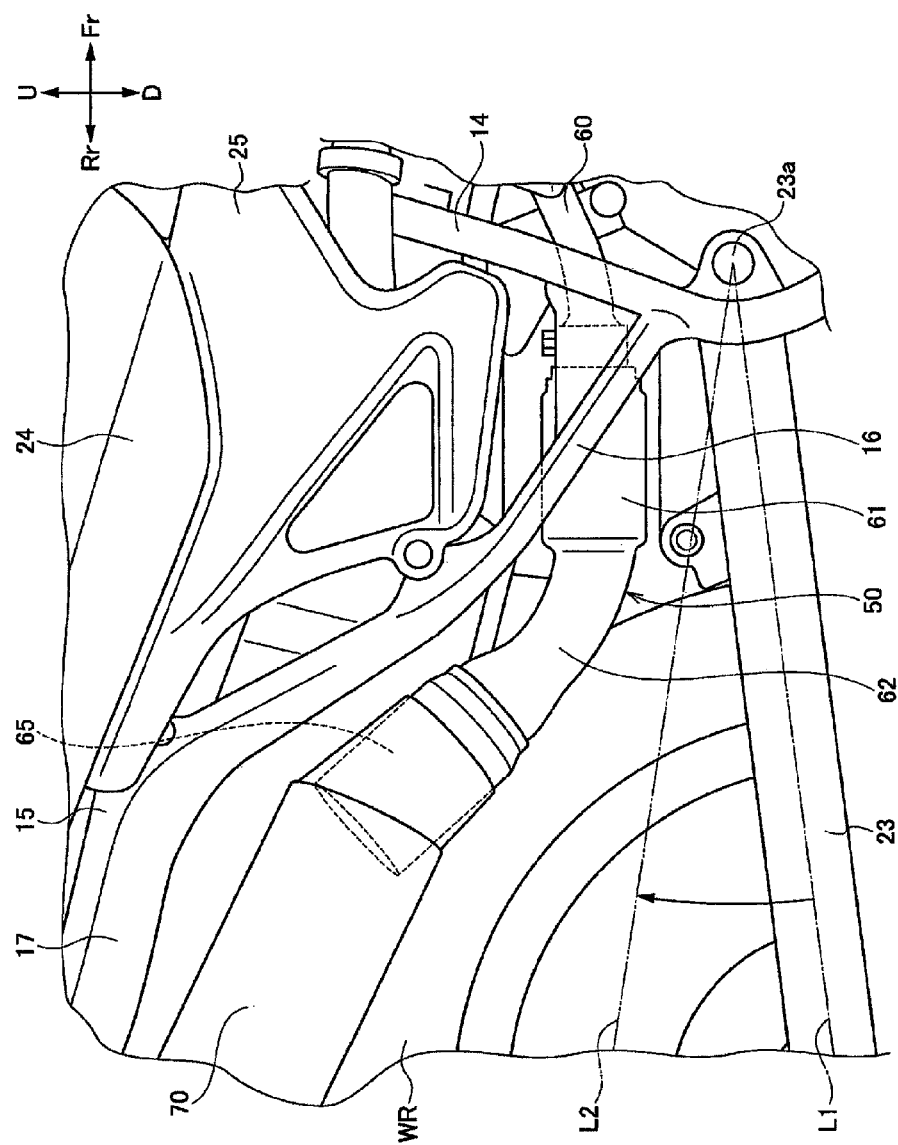
FIG. 3 is a right lateral view of the surround of the exhaust system shown in FIG. 1.

As shown in FIGS. 1 to 3, the exhaust system 50 includes an exhaust pipe 60 joined to the exhaust port 45 of the engine 40 and extending rearwardly of the vehicle body and a muffler 70 connected to the downstream end of the exhaust pipe 60 via a case 65.

The exhaust pipe 60 is formed to extend from the exhaust port 45 of the engine 40, pass the right side of the engine 40 and then extend toward the inside of the pivot frames 14. Thereafter, the exhaust pipe 60 further extends rearwardly along the front-back direction of the vehicle to form a straight portion 61 and extend rearwardly and upwardly to form a bending portion 62. The bending portion 62 of the exhaust pipe 60 has a downstream end joined to the tubular case 65.

Figure 4:
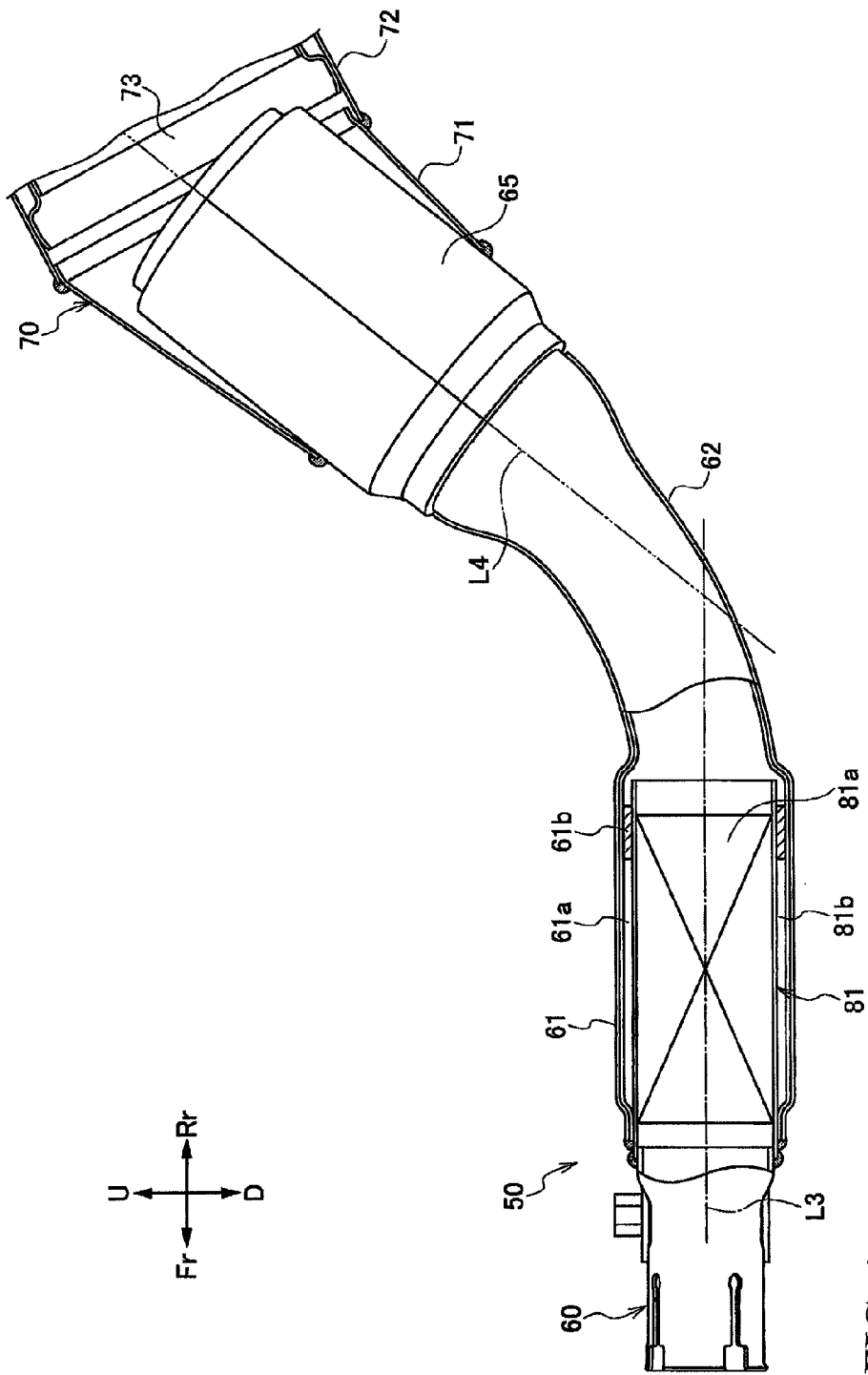
FIG. 4 is a partial-cutout left lateral view for assistance in explaining an exhaust pipe and a muffler shown in FIG. 3.
Figure 5:
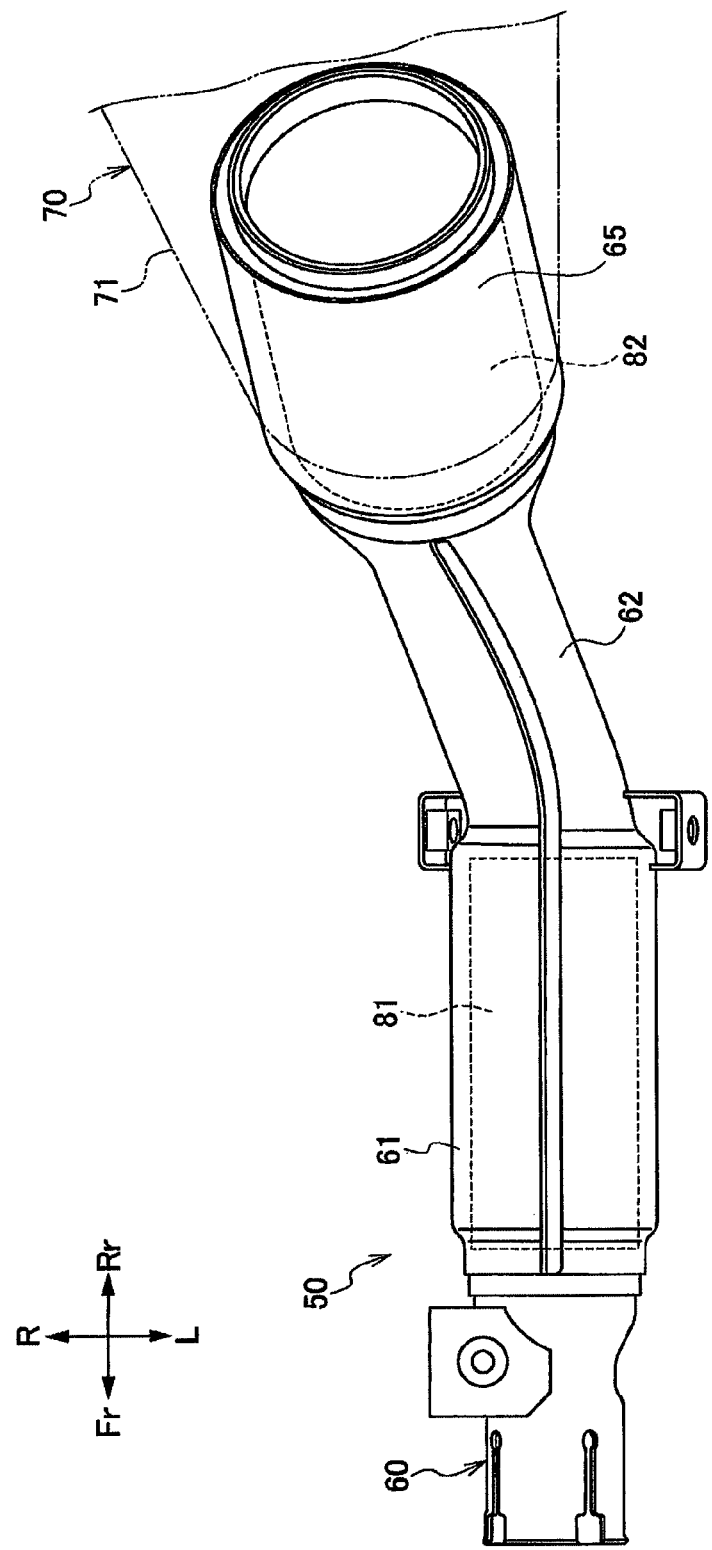
FIG. 5 is a partial-cutout top view for assistance in explaining the exhaust pipe and the muffler shown in FIG. 3.

As shown in FIGS. 4 and 5, a first catalyst body 81 is disposed in the straight portion 61 of the exhaust pipe 60. The straight portion 61 of the exhaust pipe 60 is formed to increase in diameter at its central portion, excluding its upstream and downstream end portions. The inside space of the straight portion 61 serves as a housing chamber 61a for the first catalyst body 81. The exhaust pipe 60 is formed in a left-right-divided flat-stacked shape. The straight portion 61 of the exhaust pipe 60 is welded at its upstream end to an exhaust gas inlet-side end portion of the first catalyst body 81. The first catalyst body 81 is fixedly supported at the inlet-side end portion.

The first catalyst body 81 has a catalyst main body 81a for purifying exhaust gas and an outer covering 81b that covers the outer circumferential surface of the catalyst main body 81a. An outlet-side end portion of the first catalyst body 81 is supported by an annular support member 61b.

Figure 6:
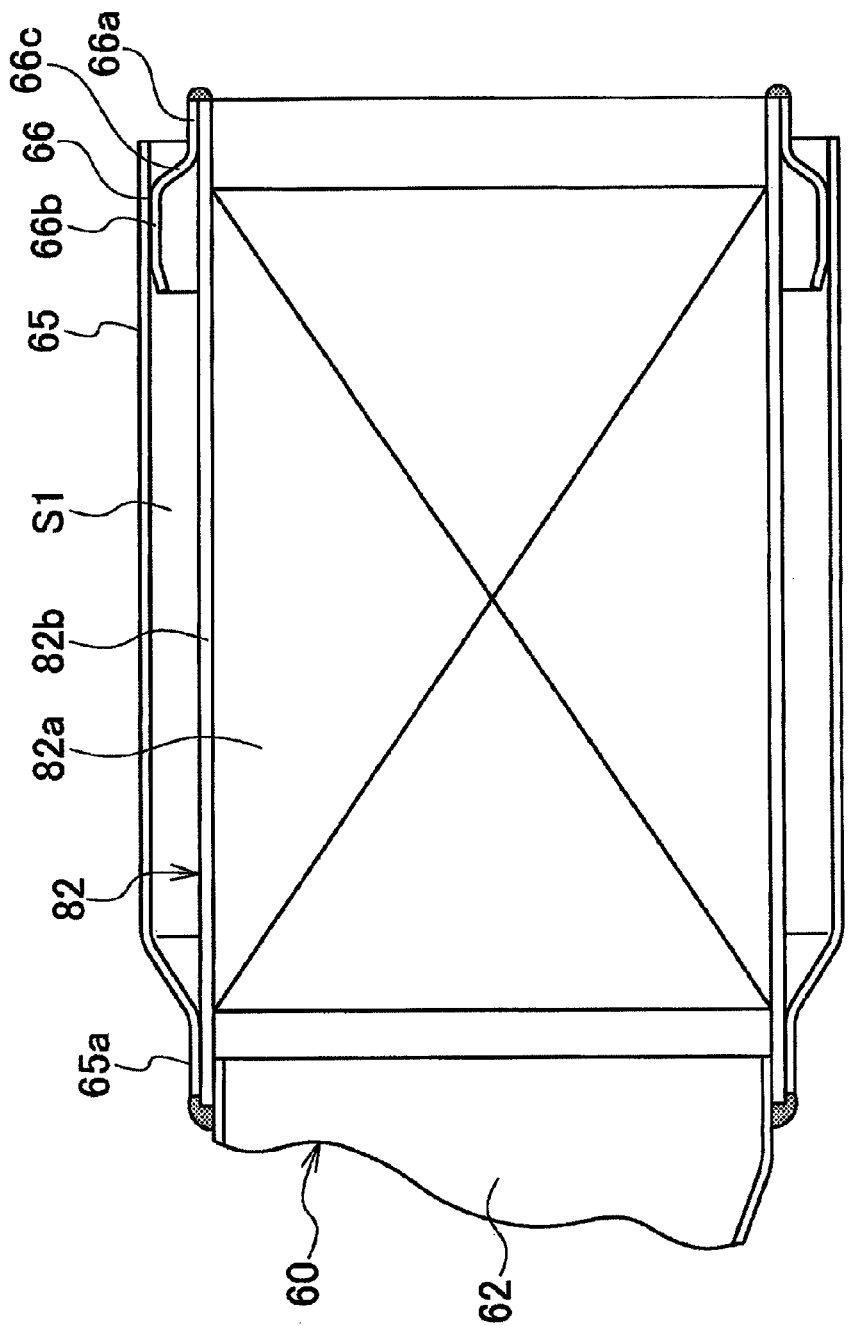
FIG. 6 is a cross-sectional view of a case and a second catalyst body shown in FIG. 5.
Figure 7:
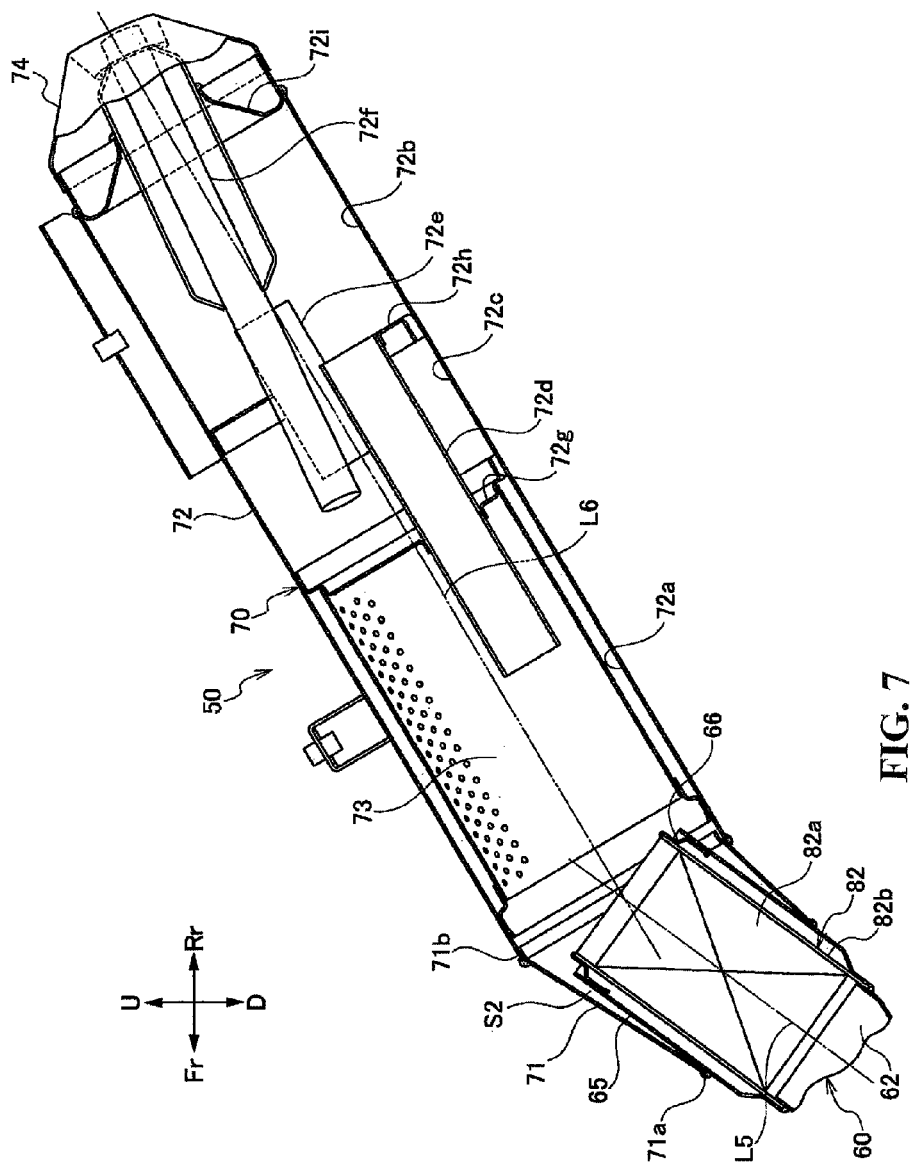
FIG. 7 is a cross-sectional view of the muffler shown in FIG. 1.

As shown in FIGS. 5 to 7, a second catalyst body 82 is disposed in the case 65. The second catalyst body 82 has a catalyst main body 82a for purifying exhaust gas and an outer covering 82b which covers the outer circumferential surface of the catalyst main body 82a.

The exhaust pipe 60 is formed to pass above the swing arm 23. Therefore, the first and second catalyst bodies 81 and 82 are disposed above the swing arm 23 as shown in FIG. 3. Further, along the axis line L2 of the swing arm 23 during the swinging the first catalyst body 81 and the second catalyst body 82 are disposed at an upside and at a downside, respectively. In addition, symbol L1 in FIG. 3 denotes an axis line of the swing arm 23 during non-swinging. The exhaust pipe 60 is formed with the bending portion 62. Therefore, an axis line L3 of the first catalyst body 81 intersects an axis line L4 of the case 65 as shown in FIG. 4.

The case 65 covers the outer circumferential surface of the second catalyst body 82 along from the exhaust gas inlet to outlet of the second catalyst body 82 with a gap S1 defined therebetween. As shown in FIG. 6, the case 65 is formed with a reduced-diameter portion 65a at its upstream end. An inlet-side end portion of an outer covering 82b of the second catalyst body 82 is fixedly supported by the reduced-diameter portion 65a. In addition, an edge portion of the reduced-diameter portion 65a of the case 65 and an edge portion of the outer covering 82b of the second catalyst body 82 are joined to the downstream end of the exhaust pipe 60 by welding.

A support piece 66 is welded to an outlet-side end portion of the outer covering 82b of the second catalyst body 82. Thus, the outlet-side end portion of the second catalyst body 82 is supported by the inner circumferential surface of the case 65 via the support piece 66.

The support piece 66 has a first tubular portion 66a, a second tubular portion 66b and a connecting portion 66c. The first tubular portion 66a is fitted to the outer circumferential surface of the outer covering 82b of the second catalyst body 82. The second tubular portion 66b has a generally curved shape in cross-section and is in slidable contact with the inner circumferential surface of the case 65. The connecting portion 66c connects the first tubular portion 66a with the second tubular portion 66b. The outer circumferential surface of the second tubular portion 66b of the support piece 66 is in slidable contact with the inner circumferential surface of the case 65. Thus, the thermal expansion of the second catalyst body 82 is absorbed by this slidable portion.

As shown in FIG. 2, the second catalyst body 82 located on the downstream side is disposed not to overlap the first catalyst body 81 located on the upstream side in the front-back direction of the vehicle in the present embodiment. Therefore, air flow resulting from the traveling of the vehicle 10 can be led to the surrounding of each of the first and second catalyst bodies 81 and 82. Thus, it is possible to reduce a thermal influence on the surrounding of each of the first and second catalyst bodies 81 and 82.

As shown in FIG. 7, the muffler 70 has a first external tubular member (an external plate) 71; a second external tubular member (an external plate) 72 joined to the downstream end of the first external tubular member 71 and an internal tubular member 73 disposed inside the front portion of the second external tubular member 72 and having punched holes. In addition, an acoustic material not shown is disposed between the first external tubular member 71 and the internal tubular member 73.

The first external tubular member 71 is formed in such a tapered shape as to be gradually increased in diameter as it extends rearwardly. The first external tubular member 71 has a small diameter portion 71a at its upstream-side end edge and a large diameter portion 71b at its downstream-side end edge. The first external tubular member 71 and the second external tubular member 72 are arranged to have axis lines L5 and L6, respectively, intersecting each other, and are welded to each other.

As shown in FIG. 7, the second external tubular member 72 includes a first sound absorbing chamber 72a, a second sound absorbing chamber 72b, a third sound absorbing chamber 72c, a first communication pipe 72d, a second communication pipe 72e and a tail pipe 72f. The first sound absorbing chamber 72a is located at the most upstream and faces the second catalyst body 82. The second sound absorbing chamber 72b is adapted to further expand the exhaust gas having passed the first sound absorbing chamber 72a. The third sound absorbing chamber 72c is adapted to further expand the exhaust gas having passed the second sound absorbing chamber 72b and then discharge it toward the atmosphere. The first communication pipe 72d allows the first sound absorbing chamber 72a and the second sound absorbing chamber 72b to communicate with each other. The second communication pipe 72e allows the second sound absorbing chamber 72b and the third sound absorbing chamber 72c to communicate with each other. The tail pipe 72f allows the third sound absorbing chamber 72c to communicate with the atmosphere. The first to third sound absorbing chambers 72a to 72c are sectioned by first to third partition walls 72g to 72i installed in the second external tubular member 72. An end cap 74 is attached to the rear end of the third partition wall 72i.

In the present embodiment, the case 65 housing the second catalyst body 82 is supported by the small diameter portion 71a of the first external tubular member 71 with the outer circumferential surface of the case 65 being partially covered by the first external tubular member 71 of the muffler 70. Thus, the second catalyst body 82 is installed inside the muffler 70. Space S2 between the inner circumferential surface of the first external tubular member 71 of the muffler 70 and the external circumferential surface of the case 65 communicates with the first sound absorbing chamber 72a located on the downstream side of the second catalyst body 82.

As described above, the exhaust system 50 of the present embodiment has the tubular case 65 that covers the outer circumferential surface of the second catalyst body 82 from the exhaust gas inlet to outlet of the second catalyst body 82. The inlet-side end portion of the second catalyst body 82 is secured to the one end portion of the case 65 and the outlet-side end portion of the second catalyst body 82 is supported by the other end portion of the case 65. The case 65 is supported at the outer circumferential surface by the front end portion of the muffler 70. Therefore, while absorbing the thermal expansion of the second catalyst body 82, the second catalyst body 82 can be supported stably. In addition, it is possible to make it hard for the heat of the second catalyst body 82 to be transmitted to the first and second external tubular members 71 and 72 of the muffler 70.

According to the exhaust system 50 of the present embodiment, the space S2 between the first external tubular member 71 of the muffler 70 and the case 65 communicates with the first sound absorbing chamber 72a on the downstream side of the second catalyst body 82. Therefore, the space S2 between the first external tubular member 71 of the muffler 70 and the case 65 can be used as a sound absorbing chamber. Thus, the downsizing of the muffler 70 can be achieved.

According to the exhaust system 50 of the present embodiment, the first catalyst body 81 is disposed inside the exhaust pipe 60 on the upstream side of the second catalyst body 82 and the exhaust pipe 60 is joined to the case 65 at its downstream end. Therefore, the second catalyst body 82 can be brought close to the first catalyst body 81. Thus, the reaction heat of the first catalyst body 81 becomes easy to be transmitted to the second catalyst body 82. Thus, the exhaust gas purifying performance of the first and second catalyst bodies 81 and 82 can be enhanced.

According to the exhaust system 50 of the present embodiment, the exhaust pipe 60 is curvedly formed so that the axis line L3 of the first catalyst body 81 may intersect the axis line L4 of the case 65. Therefore, the exhaust pipe 60 is configured to bend while the first catalyst body 81 and the second catalyst body 82 are brought close to each other. Thus, the flow of exhaust gas is made turbulent so that the exhaust gas is stirred, which can enhance the purifying performance of the second catalyst body 82.

According to the exhaust system 50 of the present embodiment, the exhaust pipe 60 is formed in a left-right-divided flat-stacked shape so as to be joined to the inlet-side end portion of the first catalyst body 81. Therefore, the bending shape of the housing chamber 61a housing the first catalyst body 81 and of the exhaust pipe 60 can be formed accurately and inexpensively.

According to the exhaust system 50 of the present embodiment, the exhaust pipe 60 is formed such that the first and second catalyst bodies 81 and 82 are disposed above the swing arm 23. In addition, along the swing arm 23 during the swinging the first catalyst body 81 and the second catalyst body 82 are disposed at an upside and at a downside, respectively. Therefore, while the exhaust pipe 60 having the first and second catalyst bodies 81 and 82 is disposed in the rear portion of the vehicle body, the first and second catalyst bodies 81 and 82 can be spaced away from the road surface and an occupant. Thus, while protecting the exhaust system 50, the downsizing of the motorcycle 10 can be achieved.

In addition, the present invention is not limited to the embodiment described above as an example. The invention can arbitrarily be modified in a range not departing from the gist thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust system for a saddle-ride vehicle having a catalyst body in a muffler, comprising:
    a tubular case, said tubular case covering an outer circumferential surface of the catalyst body along an exhaust gas inlet to outlet of the catalyst body;
    an inlet-side end portion and an outlet-side end portion being formed in the catalyst body, said inlet-side end portion thereof being secured to one end portion of the tubular case and supported at said outlet-side end portion thereof by another end portion of the tubular case,
    wherein the tubular case is supported at an outer circumferential surface thereof by a front end portion of the muffler,
    wherein the tubular case and the catalyst body in the tubular case are entirely located above a swing arm supporting a rear wheel of the saddle-ride vehicle,
    wherein the catalyst body is overlapped with the swing arm from a top view of the saddle-ride vehicle, and
    wherein the catalyst body includes a first catalyst body and a second catalyst body, and the first catalyst body is disposed not to overlap the catalyst body in a front-back direction of the saddle-ride vehicle and in an up-down direction of the saddle-ride vehicle.

2. The exhaust system for a saddle-ride vehicle according to claim 1, wherein a space between an external plate of the muffler and the case communicates with a sound absorbing chamber located on the downstream side of the catalyst body.

3. The exhaust system for a saddle-ride vehicle according to claim 2, wherein the catalyst body includes a second catalyst body;
    a first catalyst body being disposed in a portion an exhaust pipe located on the upstream side of the second catalyst body, wherein the first catalyst body and the portion of the exhaust pipe where the first catalyst body is located are entirely located above the swing arm; and
    the exhaust pipe includes a downstream end joined to the tubular case.

4. The exhaust system for a saddle-ride vehicle according to claim 3, wherein the exhaust pipe is curvedly formed so that an axis line of the first catalyst body may intersect an axis line of the tubular case.

5. The exhaust system for a saddle-ride vehicle according to claim 4, wherein the exhaust pipe is formed in a left-right-divided flat-stacked shape so as to be joined to the inlet side end portion of the first catalyst body.

6. The exhaust system for a saddle-ride vehicle according to claim 3, wherein the first catalyst body is disposed within a straight portion of the exhaust pipe wherein the straight portion is formed to increase in diameter at its central portion relative to an upstream and downstream end portion of the exhaust pipe.

7. The exhaust system for a saddle-ride vehicle according to claim 6, wherein the first catalyst body includes a catalyst main body for purifying exhaust gas and an outer covering for covering the outer circumferential surface of the catalyst main body, an outlet-side end portion of the first catalyst body is supported by an annular support member.

8. The exhaust system for a saddle-ride vehicle according to claim 3, wherein the second catalyst body is disposed in the tubular case, said second catalyst body is adapted to purify exhaust gas and includes an outer covering for covering the outer circumferential surface of the second catalyst body.

9. The exhaust system for a saddle-ride vehicle according to claim 3, wherein the tubular case covers an outer circumferential surface of the second catalyst body from the exhaust gas inlet to the exhaust gas outlet of the second catalyst body with a gap defined therebetween, said tubular case is formed with a reducing-diameter portion at an upstream end thereof with the inlet-side end portion of the outer cover of the second catalyst body being fixed to the reduced-diameter portion.

10. The exhaust system for a saddle-ride vehicle according to claim 1, wherein the catalyst body is supported by the tubular case with a gap, and a front of the tubular case is connected to an exhaust pipe, and the catalyst body is entirely covered by the tubular case, the tubular case has an increased-diameter portion, the front end portion of the muffler is supported at the increased-diameter portion, and the tubular case is partially covered by a first external tubular case of the muffler.

11. An exhaust system for a saddle-ride vehicle comprising:
    a catalyst body having an exhaust gas inlet and an exhaust gas outlet;
    a muffler, said catalyst body being positioned within said muffler;
    a tubular case, said tubular case covering an outer circumferential surface of the catalyst body along the exhaust gas inlet to the exhaust gas outlet of the catalyst body; and
    an inlet-side end portion and an outlet-side end portion being formed in the catalyst body, said inlet-side end portion thereof being secured to one end portion of the tubular case and supported at said outlet-side end portion thereof by another end portion of the tubular case,
    wherein the tubular case is supported at an outer circumferential surface thereof by a front end portion of the muffler,
    wherein the tubular case and the catalyst body in the tubular case are entirely located above a swing arm supporting a rear wheel of the saddle-ride vehicle,
    wherein the catalyst body is overlapped with the swing arm from a top view of the saddle-ride vehicle, and
    wherein the catalyst body includes a first catalyst body and a second catalyst body, and the first catalyst body is disposed not to overlap the catalyst body in a front-back direction of the saddle-ride vehicle and in an up-down direction of the saddle-ride vehicle.

12. The exhaust system for a saddle-ride vehicle according to claim 11, wherein a space between an external plate of the muffler and the case communicates with a sound absorbing chamber located on the downstream side of the catalyst body.

13. The exhaust system for a saddle-ride vehicle according to claim 12, wherein the catalyst body includes a second catalyst body;
a first catalyst body being disposed in a portion of an exhaust pipe located on the upstream side of the second catalyst body, wherein the first catalyst body and the portion of the exhaust pipe where the first catalyst body is located are entirely located above the swing arm; and
the exhaust pipe includes a downstream end joined to the tubular case.

14. The exhaust system for a saddle-ride vehicle according to claim 13, wherein the exhaust pipe is curvedly formed so that an axis line of the first catalyst body may intersect an axis line of the tubular case.

15. The exhaust system for a saddle-ride vehicle according to claim 14, wherein the exhaust pipe is formed in a left-right-divided flat-stacked shape so as to be joined to the inlet side end portion of the first catalyst body.

16. The exhaust system for a saddle-ride vehicle according to claim 13, wherein the first catalyst body is disposed within a straight portion of the exhaust pipe wherein the straight portion is formed to increase in diameter at its central portion relative to an upstream and downstream end portion of the exhaust pipe.

17. The exhaust system for a saddle-ride vehicle according to claim 16, wherein the first catalyst body includes a catalyst main body for purifying exhaust gas and an outer covering for covering the outer circumferential surface of the catalyst main body, an outlet-side end portion of the first catalyst body is supported by an annular support member.

18. The exhaust system for a saddle-ride vehicle according to claim 13, wherein the second catalyst body is disposed in the tubular case, said second catalyst body is adapted to purify exhaust gas and includes an outer covering for covering the outer circumferential surface of the second catalyst body.

19. The exhaust system for a saddle-ride vehicle according to claim 13, wherein the tubular case covers an outer circumferential surface of the second catalyst body from the exhaust gas inlet to the exhaust gas outlet of the second catalyst body with a gap defined therebetween, said tubular case is formed with a reducing-diameter portion at an upstream end thereof with the inlet-side end portion of the outer cover of the second catalyst body being fixed to the reduced-diameter portion.

20. The exhaust system for a saddle-ride vehicle according to claim 11, wherein the catalyst body is supported by the tubular case with a gap, and a front of the tubular case is connected to an exhaust pipe.

* * * * *